(12) United States Patent
Hamada et al.

(10) Patent No.: US 7,596,292 B2
(45) Date of Patent: Sep. 29, 2009

(54) TREATMENT METHOD FOR OPTICAL FIBER

(75) Inventors: Takahiro Hamada, Sakura (JP); Kenji Yamashiro, Sakura (JP); Munehisa Fujimaki, Sakura (JP); Koichi Harada, Sakura (JP); Yukinari Shirako, Sakura (JP); Hiroyuki Sawano, Sakura (JP); Shunichirou Hirafune, Sakura (JP)

(73) Assignee: Fujikura Ltd., Tokyo (JP)

( * ) Notice: Subject to any disclaimer, the term of this patent is extended or adjusted under 35 U.S.C. 154(b) by 727 days.

(21) Appl. No.: 11/289,335

(22) Filed: Nov. 30, 2005

(65) Prior Publication Data

US 2006/0127018 A1 Jun. 15, 2006

(30) Foreign Application Priority Data

Dec. 2, 2004 (JP) ............................. P2004-349938

(51) Int. Cl.
*G02B 6/02* (2006.01)
(52) U.S. Cl. .................. 385/123; 385/141; 385/142; 385/143
(58) Field of Classification Search ............. 385/123, 385/141, 142, 143
See application file for complete search history.

(56) References Cited

U.S. PATENT DOCUMENTS

| 2003/0010064 A1 | 1/2003 | Kuwahara et al. |
| 2003/0084684 A1 | 5/2003 | Zhang |
| 2004/0139766 A1 | 7/2004 | Weeks et al. |

FOREIGN PATENT DOCUMENTS

| EP | 1 182 176 A1 | 2/2002 |
| JP | 63-151642 A | 6/1988 |
| JP | 2002-234749 A | 8/2002 |
| JP | 2003-137580 A | 5/2003 |
| JP | 2003-255143 A | 9/2003 |
| JP | 2003-261351 A | 9/2003 |
| JP | 2004-226979 A | 8/2004 |
| JP | 2004-228979 A | 8/2004 |
| SU | 1776646 | 11/1992 |

OTHER PUBLICATIONS

International Electrotechnical Commission, "Optical Fibres—Part 2-50: Product Specifications—Sectional Specification for Class B Single-Mode Fibres," International Standard, First Edition, 2002.

*Primary Examiner*—Jennifer Doan
(74) *Attorney, Agent, or Firm*—Sughrue Mion, PLLC

(57) ABSTRACT

A treatment method for an optical fiber including accommodating an optical fiber inside a treatment chamber; introducing a deuterium containing gas into the treatment chamber; and in a deuterium treatment step, exposing the optical fiber to atmosphere of the deuterium containing gas. In the deuterium treatment step, a deuterium concentration D in the treatment chamber during the deuterium treatment is calculated from an initial value A of a deuterium concentration in the deuterium containing gas inside the treatment chamber, a concentration B of oxygen in an ambient atmosphere of the treatment chamber, and a concentration C of oxygen in the deuterium containing gas inside the treatment chamber, and the deuterium concentration in the treatment chamber is controlled based on the deuterium concentration D calculated. Other gases such as hydrogen containing gas or nitrogen containing gas may also be used according to the invention.

24 Claims, 3 Drawing Sheets

TREATMENT METHOD FOR OPTICAL FIBER

CROSS-REFERENCE TO RELATED APPLICATION

This application claims priority to Japanese Patent Application No. 2004-349938, filed Dec. 2, 2004, the contents of which are incorporated herein by reference.

BACKGROUND OF THE INVENTION

1. Field of the Invention

The invention relates to a treatment method for an optical fiber.

2. Description of Related Art

After rendering optical fibers into a cable and laying the optical fiber cable, the transmission loss in a wavelength band of about 1400 nm of the optical fiber increases, and the transmission characteristics of the optical fiber degrade.

In order to inhibit this degradation of the optical fiber transmission characteristics, a treatment method for optical fibers is applied in which an optical fiber is exposed to hydrogen or deuterium in advance.

However, when carrying out a treatment method in which the optical fiber is exposed to hydrogen (hydrogen treatment), there is a problem in that the initial transmission loss of the optical fiber in a wavelength region of about 1383 nm increases. In contrast, when carrying out a treatment method in which the optical fiber is exposed to deuterium (deuterium treatment), no such problem occurs. Thus, the hydrogen treatment or the deuterium treatment must be selected and applied depending on the object.

Various methods have been proposed for applying a deuterium treatment to an optical fiber. In one method (see, for example, Japanese Unexamined Patent Application, First Publication No. 2003-137580), a gas that contains deuterium gas (hereinbelow, referred to as a "deuterium containing gas") continuously flows into a sealable treatment chamber, and the atmosphere in the treatment chamber is replaced by the deuterium containing gas. In another method (see, for example, Japanese Unexamined Patent Application, First Publication No. 2004-226979), after decreasing the pressure inside the treatment chamber, the inside of the treatment chamber is filled with the deuterium containing gas, and thereby the atmosphere inside the treatment chamber is replaced by the deuterium containing gas. In the latter method, recovery of the deuterium containing gas is possible.

In addition, the hydrogen test method stipulated in IEC60793-2-50 is an example of a method for applying a hydrogen treatment to an optical fiber. In this hydrogen test method, an optical fiber is exposed to 1% hydrogen gas atmosphere or 100% hydrogen gas atmosphere at room temperature until the transmission loss at a wavelength of 1240 nm is equal to or greater than 0.03 dB/km. However, in this hydrogen test method, specific conditions of the treatment methods (treatment conditions) are not stipulated.

In the case in which a deuterium treatment is applied to an optical fiber, when using the method in which the deuterium containing gas continuously flows into the treatment chamber, the treatment is applied while eliminating deuterium containing gas until the inside of the treatment chamber reaches a predetermined deuterium concentration. Thus, each time the deuterium treatment is applied, it is possible to maintain a predetermined deuterium concentration in the treatment chamber.

However, in order to increase the production efficiency, the treatment must be applied at one time to an optical fiber having a long length, and accompanying this, the volume of the treatment chamber for applying the treatment to the optical fiber becomes large. Depending on how large the volume of the treatment chamber becomes, the amount of deuterium containing gas necessary for replacing the atmosphere in the treatment chamber increases, and thereby the cost also increases.

In contrast, when using the method in which the treatment chamber is filled with deuterium containing gas after the pressure in the treatment chamber has been reduced, because creating a complete vacuum inside the treatment chamber is difficult, air that remains in the treatment chamber from each treatment mixes with the deuterium containing gas. As the number of treatments increases, the deuterium concentration in the recovered deuterium containing gas becomes low.

When the deuterium concentration in the deuterium containing gas becomes low, there are also concerns in that not only is a long time required until the deuterium has sufficiently permeated the optical fiber, but also that the deuterium treatment may become inadequate. Thus, in order to prevent defective deuterium treatments, it is necessary to monitor the deuterium concentration when applying the deuterium treatment to the optical fiber.

An inflammable gas detector, an optical gas densitometer, or the like are examples of devices that measure the deuterium concentration. When using an air-based deuterium containing gas, it is possible to measure the deuterium concentration by such measuring devices. Note that here, any gas whose composition ratios are similar to those of the atmosphere is referred to as "air".

However, when air is mixed into the deuterium containing gas and the composition ratios of the gas differ from those of the atmosphere, it becomes impossible to measure the deuterium concentration correctly by using the measuring devices described above. In a combustion densitometer such as an inflammable gas detector, deuterium is combusted, and the deuterium concentration is calculated from the amount of heat generated during the combustion. Thus, in the case in which, instead of air, an inert gas such as nitrogen, argon, helium, or the like serves as the base, the combustion becomes poor, and thus the concentration cannot be correctly measured.

In addition, in an optical densitometer such as an optical gas densitometer, the deuterium concentration is calculated from the relative index of refraction of the deuterium containing gas. Thus, in the case in which the composition ratio of the gas that serves as the base fluctuates, it is not possible to measure the deuterium concentration correctly.

In addition, it is possible to measure the deuterium concentration by analyzing the molecules of the deuterium gas included in the deuterium containing gas. However, this is not preferable because the measurement takes time, and thus the production costs drastically increase.

SUMMARY OF THE INVENTION

In consideration of the problems described above, an object of the invention is to provide a treatment method for an optical fiber that can correctly control a deuterium concentration even when a gas that serves as a base of a deuterium containing gas is a gas other than air, and a composition ratio of a gas that serves as a base fluctuates.

The invention provides a treatment method for an optical fiber, including: accommodating an optical fiber inside a treatment chamber; introducing a deuterium containing gas into the treatment chamber; and in the deuterium treatment step, exposing the optical fiber to atmosphere of the deuterium containing gas, wherein, in the deuterium treatment step, a deuterium concentration D in the treatment chamber during the deuterium treatment is calculated from an initial value A of a deuterium concentration in the deuterium containing gas inside the treatment chamber, a concentration B of oxygen in an ambient atmosphere of the treatment chamber, and a concentration C of oxygen in the deuterium containing gas inside the treatment chamber, and the deuterium concentration in the treatment chamber is controlled based on the deuterium concentration D calculated.

In the treatment method for an optical fiber, the deuterium concentration D in the treatment chamber during the deuterium treatment step can be calculated using EQ. 1 below:

$$D = A \times (1 - C/B) \qquad \text{EQ. 1}$$

where A indicates the initial value of the deuterium concentration in the deuterium containing gas inside the treatment chamber, B indicates the concentration of oxygen in the ambient atmosphere (air) of the treatment chamber, and C indicates the concentration of oxygen in the deuterium containing gas inside the treatment chamber.

The invention further provides a treatment method for an optical fiber, including: accommodating an optical fiber inside a treatment chamber; introducing a hydrogen containing gas into the treatment chamber; and in a hydrogen treatment step, exposing the optical fiber to atmosphere of the hydrogen containing gas, wherein, in the hydrogen treatment step, a hydrogen concentration $\delta$ in the treatment chamber during the hydrogen treatment is calculated from an initial value $\alpha$ of a hydrogen concentration in the hydrogen containing gas inside the treatment chamber, a concentration $\beta$ of oxygen in an ambient atmosphere of the treatment chamber, and a concentration $\gamma$ of oxygen in the hydrogen containing gas inside the treatment chamber, and the hydrogen concentration in the treatment chamber is controlled based on the hydrogen concentration $\delta$ calculated.

In the treatment method for an optical fiber, the hydrogen concentration $\delta$ in the treatment chamber during the hydrogen treatment step is calculated using EQ. 2 below:

$$\delta = \alpha \times (1 - \gamma/\beta) \qquad \text{EQ. 2}$$

where $\alpha$ indicates the initial value of the hydrogen concentration in the hydrogen containing gas inside the treatment chamber, $\beta$ indicates the concentration of oxygen in the ambient atmosphere (air) of the treatment chamber, and $\gamma$ indicates the concentration of oxygen in the hydrogen containing gas inside the treatment chamber.

In the treatment method for an optical fiber described above, preferably the treatment chamber is a sealed chamber.

In the treatment method for an optical fiber described above, a reduced pressure state may preferably be created inside the treatment chamber before the deuterium containing gas is introduced. Preferably, but not necessarily, pressure in the treatment chamber during the reduced pressure state is set within a range of equal to or greater than 0.01 kPa to equal to or less than 75 kPa.

In the treatment method for an optical fiber described above, partial pressure of deuterium during the deuterium treatment step may preferably be set within a range of equal to or greater than 0.1 kPa to equal to or less than 5 kPa, and partial pressure of hydrogen during the hydrogen treatment step may preferably be set within a range of equal to or greater than 0.1 kPa to equal to or less than 4 kPa.

In the treatment method for an optical fiber described above, pressure in the treatment chamber during the deuterium treatment step or the hydrogen treatment step may preferably, but not necessarily, be set within a range of equal to or greater than 10.1 kPa to equal to or less than 203 kPa.

In the treatment method for an optical fiber described above, temperature inside the treatment chamber may be maintained at a constant temperature within a range of equal to or greater than 5° C. to equal to or less than 40° C. during the deuterium treatment step or the hydrogen treatment step.

According to the treatment method for an optical fiber of the invention, in the case in which concentration control of the gas used in a treatment of an optical fiber is necessary, even in the case in which direct measurement of the concentration is not possible due to the capacity of the concentration measuring device, it is possible to measure the concentration of the oxygen mixed in the measured gas inside the treatment chamber and easily calculate the concentration of the measured gas from this oxygen concentration. Therefore, in order to determine the concentration of the measured gas, it is not necessary to extract the measured gas and analyze the measured gas by using a complicated analyzing apparatus such as gas chromatography. Thereby, it is possible to determine the concentration of the measured gas easily at that time. Thus, a treatment method for an optical fiber of the invention is an advantageous treatment method in terms of manufacture because it is possible to reduce cost and time.

DETAILED DESCRIPTION OF THE INVENTION

Below, a treatment method for an optical fiber that applies embodiments of the invention will be explained in detail.

In the treatment method for an optical fiber of the invention, first, during the fabrication step of the optical fiber, in order to annihilate non-bridging oxygen hole centers (hereinbelow, abbreviated "NBOHCs") generated in the optical fiber, a deuterium treatment or a hydrogen treatment is applied to the optical fiber (in the first embodiment to the fourth embodiment).

Figure 1:
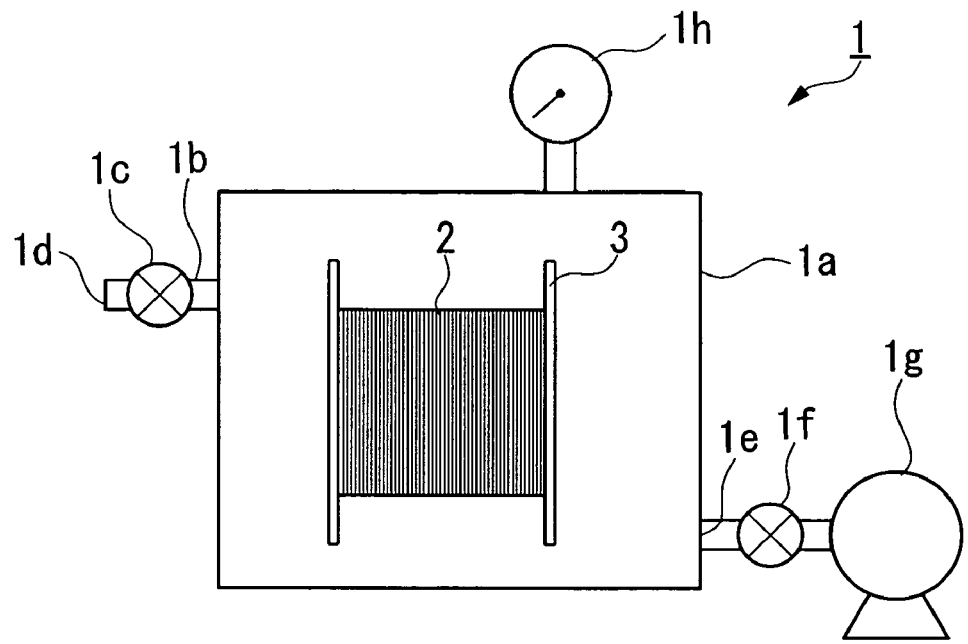
FIG. 1 is a schematic structural drawing showing an example of an optical fiber treatment apparatus of the invention.

FIG. 1 is a schematic structural drawing showing an example of the optical fiber treatment apparatus that is used in the treatment method for an optical fiber according to the invention.

In FIG. 1, reference symbol 1 denotes the optical fiber treatment apparatus, reference symbol 1a denotes a reaction chamber, reference symbol 1b denotes a gas inlet, reference symbol 1c denotes a gas inlet opening and closing valve, reference symbol 1d denotes a gas supply piping, reference symbol 1e denotes an outlet, reference symbol 1f denotes a discharge opening and closing valve, 1g denotes a discharge pump, reference symbol 1h denotes a differential pressure gauge, reference symbol 2 denotes an optical fiber, and reference symbol 3 denotes a bobbin. This example of an optical fiber treatment apparatus 1 includes at least the reaction chamber 1a. The reaction chamber 1a is a sealable chamber that can accommodate therein the optical fiber 2, and has a vacuum state of about 0.1 kPa and a pressure resistance and sealing performance that can withstand a pressurized state from normal pressure to a pressure that is equal to or less than 250 kPa.

The gas supply piping 1d is connected to the gas inlet 1b of the reaction chamber 1a via the gas inlet opening and closing valve 1c. The deuterium containing gas can be supplied into the reaction chamber 1a from the gas supply piping 1d.

Here, deuterium containing gas denotes deuterium gas alone or a mixed gas that contains deuterium gas.

The discharge pump 1g is connected to the outlet 1e of the reaction chamber 1a via the discharge opening and closing valve 1f. The deuterium containing gas or the like in the reaction chamber 1a is discharged by this discharge pump 1g.

The differential pressure gauge 1h is disposed in the reaction chamber 1a, and thereby the pressure inside the reaction chamber 1a can be measured. Based on the values measured by the differential pressure gauge 1h, it is possible to adjust the supplied amount of deuterium containing gas and thereby create a deuterium containing gas atmosphere inside the reaction chamber 1a that has a predetermined pressure, or to start or stop the discharge pump 1g and thereby create a reduced pressure atmosphere inside the reaction chamber 1a that has a predetermined pressure.

In addition, the reaction chamber 1a includes a temperature adjusting means (not shown) such as a heater or cooling mechanism, a thermometer (not shown), or a temperature adjusting portion (not shown). Thereby, by adjusting the internal temperature, it is possible to maintain a state of constant temperature within a range of 5° C. to 40° C. inside the reaction chamber 1a.

Note that instead of the gas inlet opening and closing valve 1c, the reaction chamber 1a may include a solenoid valve (not shown) that is capable of adjusting the amount of the gas flow. However, any device that can adjust the amount of deuterium containing gas supplied into the reaction chamber 1a may be used.

Next, a first embodiment of the treatment method (NBOHC annihilation) for an optical fiber according to the invention will be explained with reference to FIG. 1.

In the treatment method for an optical fiber of this embodiment, in a first step, an optical fiber 2 is exposed to the reduced pressure atmosphere as explained below.

First, the optical fiber 2 having a predetermined length is wound around the bobbin 3.

Next, the optical fiber 2 that has been wound around the bobbin 3 is placed in the reaction chamber 1a of the treatment apparatus 1. The optical fiber 2 is not particularly limited as long as it is made of a silica glass or the like, and otherwise any type of optical fiber can be used.

Next, after the discharge pump 1g, which is a vacuum pump, is activated, the discharge opening and closing valve 1f is opened, a reduced pressure atmosphere is created inside the reaction chamber 1a, that is, inside the space accommodating the optical fiber 2, is reduced by discharging the air inside the reaction chamber 1a, and thereby the optical fiber 2 is exposed to a reduced pressure atmosphere.

Then, in a second step, following the first step, the optical fiber 2 is exposed to the deuterium containing gas atmosphere as described below.

After the discharge opening and closing valve 1f is closed, the temperature inside the reaction chamber 1a is adjusted to provide a state of constant temperature within a range of 5° C. to 40° C. by using a temperature adjusting means (not shown), a thermometer (not shown), or a temperature adjusting portion (not shown). Next, the gas inlet opening and closing valve 1c is opened and the deuterium containing gas is supplied into the reduced pressure atmosphere inside the reaction chamber 1a. The deuterium containing gas is supplied until the inside of the reaction chamber 1a reaches a predetermined pressure and the atmosphere inside the space in the reaction chamber 1a that accommodates the optical fiber 2 has been replaced by the deuterium containing gas. Then the inside of the reaction chamber 1a is sealed by closing the gas inlet opening and closing valve 1c. The optical fiber 2 is exposed to the deuterium containing gas atmosphere inside this reaction chamber 1a. Thereby, the optical fiber 2 is exposed to the deuterium containing gas atmosphere, and by reacting the NBOHCs in the silica glass that forms the optical fiber 2 with the deuterium ($D_2$) to produce deuterated hydroxyl groups (—OD), it is possible to prevent the generation of hydroxyl groups (—OH). Thereby, it is possible to shift the absorption wavelength region of the optical fiber 2 from the 1.38 µm band, which is the absorption wavelength region of the hydroxyl group, to the 1.87 µm band, which is the absorption wavelength region of the deuterated hydroxyl group. That is to say, the wavelength absorption region is shifted outside of the optical communication wavelength region. Thus, it is possible to inhibit the degradation of the transmission characteristics of the optical fiber 2 due to absorption loss caused by the hydroxyl groups in the silica glass.

In addition, according to the treatment method for an optical fiber of this embodiment, the dispersion rate of the deuterium containing gas in the reaction chamber 1a can be increased by creating a reduced pressure atmosphere inside the reaction chamber 1a that accommodates the optical fiber 2 and supplying the deuterium containing gas into the reaction chamber 1a in this reduced pressure atmosphere state. Thereby, even when the optical fiber 2 is wound around the bobbin 3, the deuterium containing gas passes through the minute gaps between the wound optical fiber 2 and spreads quickly into proximity to the coil core of the bobbin 3. Therefore, it is possible to increase the probability of contact between the optical fiber 2 in proximity to the coil core of the bobbin 3 and the deuterium gas. Thus, it is possible to apply a sufficient (uniform) deuterium treatment throughout the entire length of the optical fiber 2.

Because the NBOHCs easily bond to the deuterium to form deuterated hydroxyl groups, the reaction in which the NBOHCs and the deuterium bind to form deuterated hydroxyl groups (i.e., the reaction that annihilates NBOHCs) is greatly influenced by the probability of contact between the NBOHCs and the deuterium gas.

In the treatment method for an optical fiber of this embodiment, as described above, at the optical fiber in proximity to the coil core of the bobbin 3, it is possible to increase the probability of contact between the optical fiber 2 and the deuterium containing gas, and thereby it is possible to increase the reaction rate between the NBOHCs and the deuterium.

Therefore, it is possible to increase the reaction rate between the NBOHCs and the deuterium throughout the entire optical fiber 2 that has been wound around the bobbin 3, and it is possible to annihilate NBOHCs throughout the entire optical fiber even if the exposure time is short by using the low concentration deuterium containing gas.

Next, based on experimental results, the treatment method for an optical fiber of this embodiment will be explained in detail.

Figure 2:
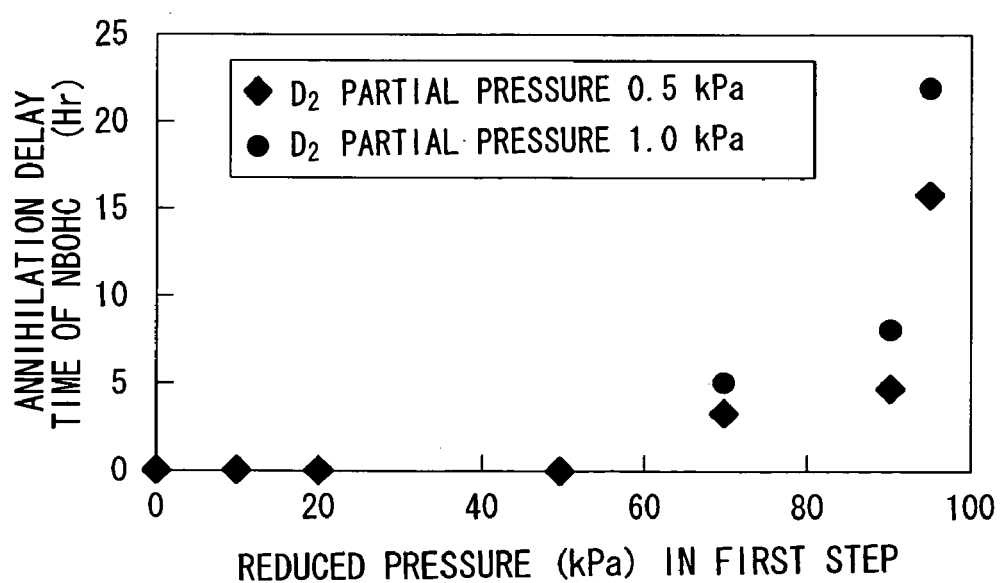
FIG. 2 is a graph showing the relationship between the annihilation delay time of the non-bridging oxygen hole centers (NBOHCs) and the pressure of the decreased pressure atmosphere in the first step.

FIG. 2 is a graph showing the relationship between the annihilation delay time of the NBOHCs of the optical fiber 2 that has been wound around the bobbin 3 and the pressure of the reduced pressure atmosphere in the first step described above.

In FIG. 2, the rhombic symbols indicate the results of the case in which, in the second step, the partial pressure of the deuterium gas in the mixed gas atmosphere is 0.5 kPa and the circular symbols indicate the result of the case in which, in the second step, the partial pressure of the deuterium gas in the mixed gas atmosphere is 1.0 kPa.

The annihilation delay time of the NBOHCs denotes the difference between the annihilation time of the NBOHCs of the optical fiber 2 positioned in the innermost layer and the annihilation time of the NBOHCs of the optical fiber 2 positioned in the outermost layer, that is, the difference between the annihilation time of the NBOHCs of the optical fiber 2 positioned in the innermost layer with respect to the annihilation time of the NBOHCs of the optical fiber 2 positioned in the outermost layer.

Among the portions of the optical fiber 2 that have been wound around the bobbin 3, the optical fiber 2 positioned in the innermost layer denotes the portion (optical fiber 2) directly wound around the coil core of the bobbin 3. In contrast, among the portions of the optical fiber 2 that has been wound around the bobbin 3, the optical fiber 2 positioned in the outermost layer denotes the portion (optical fiber 2) positioned in the outermost layer.

The shorter the annihilation delay time of the NBOHCs means that the annihilation time of the NBOHCs in the optical fiber 2 positioned in the innermost layer is also shorter (the reaction in which the NBOHCs are annihilated is fast). The annihilation time of the innermost layer becomes a value that is close to the annihilation time of the NBOHCs of the optical fiber 2 positioned in the outermost layer. This means that the time necessary to annihilate the NBOHCs throughout the entire optical fiber 2 that has been wound around the bobbin 3 is short.

The annihilation time of the NBOHCs of the optical fiber 2 denotes the result of measurement by the following method.

The amount of absorption at 0.63 μm, which is the absorption wavelength of the NBOHCs, is measured in an optical fiber 2 that has been exposed to the deuterium gas for a predetermined time, and the remaining amount of NBOHCs is measured based on this absorption amount.

Then the change over time in the remaining amount of NBOHCs with respect to the exposure time of the optical fiber 2 to the deuterium containing gas is found, the exposure time to the deuterium containing gas necessary to annihilate the NBOHCs completely is estimated based on the change over time in the remaining amount of NBOHCs, and this estimation serves as the annihilation time of the NBOHCs.

In the first step described above, the pressure of the reduced pressure atmosphere can be equal to or greater than 0.01 kPa and equal to or less than 75 kPa, and can also be equal to or greater than 0.01 kPa and equal to or less than 50 kPa. By making the pressure of the reduced pressure atmosphere equal to or greater than 0.01 kPa and equal to or less than 75 kPa, it is possible to make the dispersion rate of the deuterium containing gas high, and it is possible to make the deuterium containing gas spread throughout the entire optical fiber 2 that has been wound around the bobbin 3 or the like. Thus, in the optical fiber 2 in proximity to the coil core of the bobbin 3, it is possible to make the probability of contact between the NBOHCs and the deuterium gas high, and thereby it is possible to accelerate the reaction between the NBOHCs and the deuterium gas (the reaction that annihilates the NBOHCs). According to the above, it is possible to make the annihilation time of the NBOHCs in the optical fiber 2 positioned in the innermost layer short, and thereby, as shown in FIG. 2, the annihilation delay time of the NBOHCs can be greatly reduced.

In addition, because it is possible to make the probability of contact between the NBOHCs and the deuterium gas high, in the second step it is possible to annihilate NBOHCs throughout the entire optical fiber 2 even if a low concentration deuterium containing gas is used and the exposure time is made short.

In particular, in the case in which the pressure of the reduced pressure atmosphere is equal to or greater than 0.01 kPa and equal to or less than 50 kPa, the annihilation delay time of the NBOHCs becomes 0 or about 0, where the annihilation delay time is negligible. Thus, the NBOHCs react with the deuterium at the same reaction rate in both the optical fiber 2 positioned in the innermost layer and the optical fiber 2 positioned in the outermost layer, and thereby the NBOHCs can be annihilated.

In addition, in the second step described above, preferably the optical fiber 2 is exposed to a deuterium containing gas in which the partial pressure of the deuterium gas is equal to or greater than 0.1 kPa and equal to or less than 5 kPa. Thereby, it is possible to spread deuterium gas having a concentration that is sufficient to annihilate NBOHCs throughout the entire optical fiber 2 that has been wound around the bobbin 3 or the like.

A partial pressure of the deuterium gas less than 0.1 kPa is not preferable because the concentration of the deuterium is low, and thus it is difficult to annihilate NBOHCs throughout the entire optical fiber 2. In contrast, a partial pressure of the deuterium gas greater than 5 kPa is not preferable because a high concentration of deuterium is necessary, and thereby the fabrication cost becomes high.

In addition, in the second step, preferably the deuterium containing gas is supplied into the reaction chamber 1a that accommodates the optical fiber 2 to create a pressure inside the reaction chamber 1a equal to or greater than 10.1 kPa and equal to or less than 203 kPa, and the optical fiber 2 is exposed to the deuterium containing gas in this pressure range.

Thereby, the diffusion rate of the deuterium containing gas inside the reaction chamber 1a becomes high, the deuterium containing gas can spread quickly into proximity to the coil core of the bobbin 3, and thereby it is possible to make the reaction rate between the NBOHCs and the deuterium high.

The case in which the pressure of the deuterium containing gas in the reaction chamber 1a in which the optical fiber 2 is exposed is less than 10.1 kPa is not preferable because the diffusion rate of the deuterium containing gas inside the reaction chamber 1a is low and thus the reaction in which the NBOHCs are annihilated requires a long time.

In addition, the case in which the pressure of the deuterium containing gas in the reaction chamber 1a in which the optical fiber 2 is exposed is greater than 203 kPa is not preferable because a reaction chamber 1a having a high pressure resistance must be used, and taking into consideration safety and the like, handling of the reaction chamber 1a becomes difficult.

In the second step, preferably, but not necessarily, the exposure time during which the optical fiber 2 is exposed to the deuterium containing gas is one day or less. Thereby, it is possible to annihilate the NBOHCs throughout the entire optical fiber 2 that has been wound around the bobbin 3.

In the second step, preferably, but not necessarily, the optical fiber 2 is exposed to the deuterium containing gas in a state in which the temperature inside the reaction chamber 1a is adjusted so as to maintain a constant temperature within a range of equal to or greater than 5° C. to equal to or less than 40° C. Thereby, it is possible to accelerate the reaction between the NBOHCs in the silica glass and the deuterium, and it is possible to annihilate the NBOHCs in a short period of time.

The case in which the temperature inside the reaction chamber 1a is higher than 40° C. is not preferable because the surface covering resin layer of the optical fiber 2 will change due to the heat.

Figure 3:
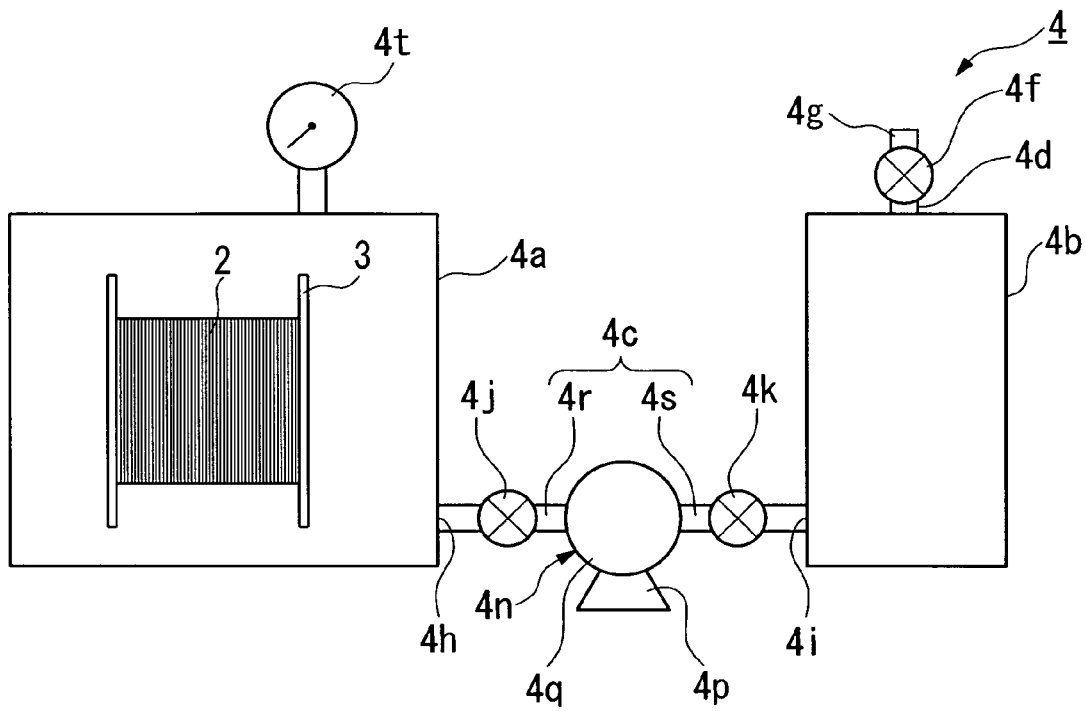
FIG. 3 is a schematic structural diagram showing an example of the optical fiber treatment apparatus of the invention.

FIG. 3 is a schematic structural diagram showing another example of the optical fiber treatment apparatus used in the treatment method for an optical fiber according to the invention.

The optical fiber treatment apparatus 4 in this example essentially includes a reaction chamber 4a, a deuterium storage tank 4b, and piping 4c by which the reaction chamber 4a communicates with the deuterium storage tank 4b.

The reaction chamber 4a is a sealable chamber that can accommodate an optical fiber 2 therein (first space), and has a vacuum state of about 0.1 kPa and a pressure resistance and sealing performance that can withstand a pressurized state from normal pressure to a pressure equal to or less than 250 kPa.

The deuterium storage tank 4b is a tank that can store the deuterium containing gas therein (second space), and, like the reaction chamber 4a, has a vacuum state of about 0.1 kPa and a pressure resistance and sealing performance that can withstand a pressurized state from normal pressure to a pressure equal to or less than 250 kPa.

The gas supply piping 4g is connected to the gas inlet 4d of the deuterium storage tank 4b via a gas inlet opening and closing valve 4f, and it is possible to supply the deuterium containing gas into the reaction chamber 4a from this gas supply piping 4g.

Gas inlet and outlet openings 4h and 4i are included in the reaction chamber 4a and the deuterium storage tank 4b. The piping 4c connects to these gas inlet and outlet openings 4h and 4i via the opening and closing valves 4j and 4k, and the reaction chamber 4a and the deuterium storage tank 4b communicate via the one piping 4c.

The inside of the piping 4c (third space) serves as the flow path, and the deuterium containing gas can flow to or from either the reaction chamber 4a or the deuterium storage tank 4b. A switching valve 4n is included along the course of the piping 4c, and a discharge pipe 4p and a gas ventilation device 4q are connected to this switching valve 4n.

Any valve that has connection portions that conduct in at least three directions and that can switch the path from the connection portion in one direction to the connection portions in any of the other two directions can be used as the switching valve 4n. A three-direction valve or a three-direction solenoid valve can be an example of the switching valve 4n.

In addition, a combination pressurizing and depressurizing pump such as a scroll vacuum pump or a dry-vacuum diaphragm pump can be used as the gas ventilation device 4q.

In the description below, a portion of the path of the piping from the switching valve 4n to the gas inlet and outlet opening 4h of the reaction chamber 4a is referred to as the reaction chamber side piping 4r, and a portion of the path of the piping from the switching valve 4n to the gas inlet and outlet opening 4i of the deuterium storage tank 4b is referred to as the deuterium storage tank side piping 4s.

In this embodiment, the switching valve 4n enables switching from one path among the reaction chamber side piping 4r, the deuterium storage tank side piping 4s, and the discharge pipe 4p to any one of the paths of the other two directions, and the gas ventilation device 4q enables ventilating the gas from one direction to the other direction among the two switched paths.

A differential pressure gauge 4t is disposed in the reaction chamber 4a, and thereby the pressure in the reaction chamber 4a can be measured. By using the gas ventilation device 4q to adjust the supplied amount of deuterium containing gas based on this measured value, it is possible to provide the inside of the reaction chamber 4a with a deuterium containing gas atmosphere that has a predetermined pressure, or create a reduced pressure atmosphere that has a predetermined pressure inside of the reaction chamber 4a.

In addition, the reaction chamber 4a includes a temperature adjusting means (not shown) such as a heater or cooling mechanism, a thermometer (not shown), or a temperature adjusting portion (not shown), and thereby it is possible to maintain a state of constant temperature within a range of 5° C. to 40° C. inside the reaction chamber 4a by adjusting the internal temperature.

Next, a second embodiment of the treatment method for an optical fiber according to the invention will be explained with reference to FIG. 3.

In the treatment method for an optical fiber of this embodiment, in a first step, the optical fiber 2 is exposed to a reduced pressure atmosphere as explained below.

First, an optical fiber 2 that has been wound around the bobbin 3 is placed inside the reaction chamber 4a. The temperature inside the reaction chamber 4a is adjusted to a constant temperature within a range of 5° C. to 40° C. Then the switching valve 4n is switched so as to connect the reaction chamber side piping 4r and the discharge pipe 4p.

Next, the opening and closing valve 4j of the reaction chamber side piping 4r is opened, the air in the reaction chamber 4a is discharged to the discharge pipe 4p by the gas ventilation device 4q, a reduced pressure atmosphere is created inside of the reaction chamber 4a, that is, inside the first space that accommodates the optical fiber 2, and the optical fiber 2 is exposed to the reduced pressure atmosphere.

Next, in the second step, following the first step, the optical fiber 2 is exposed to the deuterium containing gas as explained below.

The inside of the deuterium storage tank 4b is filled in advance with a deuterium containing gas that includes a predetermined concentration of deuterium gas at a predetermined pressure.

Next, after closing the opening and closing valve 4j of the reaction chamber side piping 4r, the switching valve 4n is switched so that the reaction chamber side piping 4r and the deuterium storage tank side piping 4s are connected. Then the opening and closing valve 4j of the reaction chamber side piping 4r and the opening and closing valve 4k of the deuterium storage tank side piping 4s are opened, and the reaction chamber 4a and the deuterium storage tank 4b communicate via the piping 4c.

In this manner, the inside of the piping 4c (third space) serves as a passage enabling the deuterium containing gas in the deuterium storage tank 4b to flow to the reaction chamber 4a, which has a reduced pressure atmosphere.

Next, when the inside of the reaction chamber 4a reaches a predetermined pressure, the reaction chamber 4a is sealed by closing the opening and closing valve 4j of the reaction chamber side piping 4r and the opening and closing valve 4k of the deuterium storage tank side piping 4s. The optical fiber 2 is exposed to the deuterium containing gas inside this reaction chamber 4a.

According to the above, the optical fiber 2 is exposed to the deuterium containing gas, the NBOHCs in the silica glass and the deuterium bind to form deuterated hydroxyl groups, and thereby it is possible to annihilate the NBOHCs.

Next, the switching valve 4n is switched so that the reaction chamber side piping 4r and the deuterium storage tank side piping 4s communicate. The opening and closing valves 4j and 4k are opened, the reaction chamber 4a and the deuterium storage tank 4b communicate via the piping 4c, the gas ventilation device 4q is activated, the deuterium containing gas inside the reaction chamber 4a is transferred to the deuterium storage tank 4b, and a vacuum is created in the inside of the reaction chamber 4a.

Next, after the opening and closing valve 4j on the reaction chamber side piping 4r is closed and air is introduced into the reaction chamber 4a, the optical fiber 2 is extracted from the reaction chamber 4a.

According to the above, without discharging the deuterium containing gas that has been used once, the deuterium containing gas is stored in the deuterium storage tank 4b and thus can be used in the deuterium treatment of another optical fiber 2.

Figure 4:
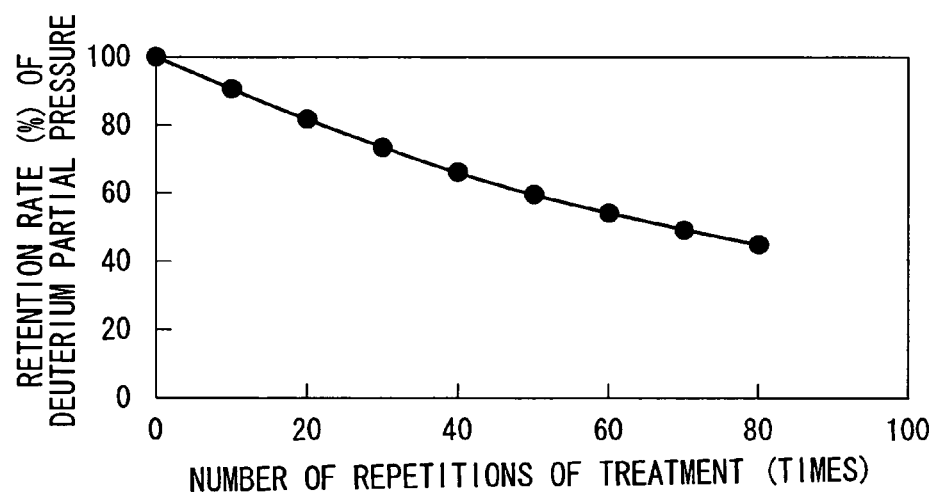
FIG. 4 is a graph showing the relationship between number of treatments and the retention rate of the partial pressure of the deuterium in the deuterium containing gas when the optical fiber has undergone deuterium treatment after the deuterium containing gas has been repeatedly used.

FIG. 4 is a graph showing the change in the partial pressure of the deuterium gas in the deuterium containing gas when, using the optical fiber treatment apparatus 4 of FIG. 3, optical fibers 2 have been treated by repeatedly using the deuterium containing gas.

In the case in which the optical fiber treatment apparatus 4 of FIG. 3 is used, even after the deuterium treatment has been carried out 30 times, the retention rate of the partial pressure of the deuterium is equal to or greater than 70%. This concentration allows satisfactory deuterium treatment to be carried out.

In this manner, it is possible to use the deuterium containing gas repeatedly, so that it is possible to reduce the running costs associated with the deuterium gas significantly, thereby creating an inexpensive deuterium treatment.

Next, a third embodiment of the treatment method for an optical fiber according to the invention will be explained with reference to FIG. 1.

The treatment method for an optical fiber in this embodiment, which annihilates the NBOHCs using a deuterium treatment, is for inhibiting an increase in the transmission loss in the optical fiber after being laid.

In the treatment method for an optical fiber of this embodiment, first an optical fiber 2 having a predetermined length is wound around a bobbin 3.

Next, the optical fiber 2 that has been wound around the bobbin 3 is placed inside the reaction chamber 1a of the treatment apparatus 1.

Then, after closing the discharge opening and closing valve 1f, the temperature inside the reaction chamber 1a is adjusted so as to maintain a state of constant temperature within a range of 5° C. to 40° C. by a temperature adjusting means (not shown), a thermometer (not shown), or a temperature adjusting portion (not shown).

Next, the gas inlet opening and closing valve 1c is opened, the deuterium containing gas is supplied into the reaction chamber 1a, and while carrying out control such that the deuterium concentration in the deuterium containing gas inside this reaction chamber 1a is constant, the optical fiber 2 is exposed to the deuterium containing gas atmosphere inside the reaction chamber 1a.

In this embodiment, in the deuterium treatment step described above, first the concentration B of the oxygen in the ambient atmosphere (air) of the reaction chamber 1a is measured. Next, the concentration C of the oxygen in the deuterium containing gas inside the reaction chamber 1a is measured. The deuterium concentration D inside the reaction chamber 1a during the deuterium treatment is calculated from the results of these measurements and the initial value A of the deuterium concentration in the deuterium containing gas inside the reaction chamber (treatment chamber) 1a using the following EQ. 1. Based on the calculated deuterium concentration D, the deuterium concentration inside the reaction chamber 1a is maintained at a concentration necessary for carrying out the deuterium treatment for the optical fiber 2 inside the reaction chamber 1a sufficiently. Specifically, in the case in which the deuterium concentration inside the reaction chamber 1a does not reach the concentration required for the deuterium treatment, the gas inlet opening and closing valve 1c is opened and deuterium containing gas is supplied into the reaction chamber 1a. In contrast, in the case in which the deuterium concentration inside the reaction chamber 1a exceeds the concentration required for the deuterium treatment, the gas inlet opening and closing valve 1c is closed and the supply of the deuterium containing gas into the reaction chamber 1a is stopped.

$$D = A \times (1 - C/B) \qquad \text{EQ. 1}$$

where D indicates a deuterium concentration inside the treatment chamber during the deuterium treatment, A indicates an initial value of the deuterium concentration in the deuterium containing gas inside the treatment chamber, B indicates concentration of oxygen in the ambient atmosphere (air) of the treatment chamber, and C indicates concentration of oxygen in the deuterium containing gas inside the treatment chamber.

An oxygen densitometer (not shown) was used in order to measure the concentration B of the oxygen in the ambient atmosphere (air) of the reaction chamber 1a and the concentration C of the oxygen in the deuterium containing gas inside the reaction chamber 1a. Examples of oxygen densitometers that may be used are Toray's LC-750 and Yokogawa's oxygen densitometer OX61.

In this manner, by measuring the concentration B of the oxygen in the ambient atmosphere (air) of the reaction chamber 1a and the concentration C of the oxygen in the deuterium containing gas inside the reaction chamber 1a, it is possible to calculate the amount of air mixed in the atmosphere inside the reaction chamber 1a, and based on this calculated value, it is possible to calculate the present deuterium concentration inside the reaction chamber 1a. Because there are dangers such as explosions when the gas used in the treatment of the optical fiber is an inflammable gas (deuterium) as in the deuterium treatment, in terms of control, measurement of the deuterium concentration using a conventional combustion densitometer or an optical densitometer is not preferable. In addition, in the case in which a deuterium containing gas is used as the gas serving as the base, the present deuterium concentration inside the reaction chamber 1a is calculated by measuring the concentration of the air, and in particular the oxygen, mixed in the deuterium containing gas inside the reaction chamber 1a. The reason for this is that a cause of the deuterium concentration becoming low is the air mixed into the deuterium containing gas inside the reaction chamber 1a during the deuterium treatment. Therefore, if the amount (concentration) of the air (oxygen) mixed into the deuterium containing gas inside the reaction chamber 1a can be determined, then it is possible to determine the present deuterium concentration inside the reaction chamber 1a.

Thus, according to the treatment method for an optical fiber in this embodiment, there are no dangers such as explosions, and thereby it is possible to control the deuterium concentration correctly even when the composition ratios of the base gas (the deuterium containing gas) inside the reaction chamber 1a fluctuate.

In addition, in the treatment method for an optical fiber in this embodiment, preferably the reaction chamber 1a is a sealed container. If the reaction chamber 1a is a sealed container, before carrying out the deuterium treatment for the optical fiber 2 inside the reaction chamber 1a, a reduced pressure atmosphere can be created inside the reaction chamber 1a.

Furthermore, in the treatment method for an optical fiber in this embodiment, preferably the deuterium treatment of the optical fiber 2 is carried out after a reduced pressure atmosphere has been created inside the reaction chamber 1a.

In this embodiment, a method will be explained in which the deuterium treatment of the optical fiber 2 is carried out after a reduced pressure atmosphere has been created inside the reaction chamber 1a.

After placing the optical fiber 2 inside the reaction chamber 1a of the treatment apparatus 1 and activating the discharge pump 1g, which is a vacuum pump, the discharge opening and closing valve 1f is opened, a reduced pressure atmosphere is created inside the reaction chamber 1a, that is, inside the space accommodating the optical fiber 2, by discharging the air inside the reaction chamber 1a, and thereby the optical fiber 2 is exposed to the reduced pressure atmosphere.

Next, after providing a state of constant temperature within a range of 5° C. to 40° C. by adjusting the temperature inside the reaction chamber 1a, the gas inlet opening and closing valve 1c is opened and the deuterium containing gas is supplied into the reduced pressure atmosphere inside the reaction chamber 1a. Subsequently, the deuterium containing gas is supplied until the inside of the reaction chamber 1a reaches a predetermined pressure and the atmosphere in the space inside the reaction chamber 1a that accommodates the optical fiber 2 is replaced by the deuterium containing gas. Then the inside of the reaction chamber 1a is sealed by closing the gas inlet opening and closing valve 1c, and the optical fiber 2 is exposed to the deuterium containing gas atmosphere in this reaction chamber 1a.

In this manner, it is possible to make the dispersion rate of the deuterium containing gas inside the reaction chamber 1a high by creating a reduced pressure atmosphere inside the reaction chamber 1a that accommodates the optical fiber 2 and supplying the deuterium containing gas inside the reaction chamber 1a in this reduced pressure state. Thereby, even when the optical fiber 2 has been wound around a bobbin 3, the deuterium containing gas passes through minute gaps between the wound optical fiber 2 and spreads quickly into proximity to the coil core of the bobbin 3. Therefore, the probability of contact between the optical fiber 2 in proximity to the coil core of the bobbin 3 and the deuterium containing gas can be made high. Thus, it is possible to apply the deuterium treatment sufficiently (evenly) throughout the entire length of the optical fiber 2.

In addition, this third embodiment of the treatment method for an optical fiber can be applied even when the measured gas is hydrogen other than deuterium or a gas other than oxygen, such as nitrogen.

Next, a fourth embodiment of the treatment method for an optical fiber according to the invention will be explained with reference to FIG. 1.

The treatment method for an optical fiber in this embodiment, which annihilates the NBOHCs using a hydrogen treatment, is for inhibiting an increase in the transmission loss in the optical fiber after being laid.

In the treatment method for an optical fiber of this embodiment, first, an optical fiber 2 having a predetermined length is wound around a bobbin 3.

Next, the optical fiber 2 that has been wound around the bobbin 3 is placed inside the reaction chamber 1a of the treatment apparatus 1.

Next, after closing the discharge opening and closing valve 1f, the temperature inside the reaction chamber 1a is maintained at a state of constant temperature within a range of 5° C. to 40° C. by adjusting the temperature therein by using a temperature adjusting means (not shown), a thermometer (not shown), or a temperature adjusting portion (not shown).

Next, the gas inlet opening and closing valve 1c is opened, the hydrogen containing gas is supplied into the reaction chamber 1a, and the optical fiber 2 is exposed to the hydrogen containing gas atmosphere in the reaction chamber 1a while control is carried out so that the hydrogen concentration in the hydrogen containing gas atmosphere in this reaction chamber 1a remains constant.

In this embodiment, in the hydrogen treatment step described above, first the concentration $\beta$ of the oxygen in the ambient atmosphere (air) of the reaction chamber 1a is measured. Next, the concentration $\gamma$ of the oxygen in the hydrogen containing gas inside the reaction chamber 1a is measured. The hydrogen concentration $\delta$ in the reaction chamber 1a during the hydrogen treatment is calculated from the results of these measurements and the initial value $\alpha$ of the hydrogen concentration in the hydrogen containing gas inside the reaction chamber 1a (treatment chamber) using the following EQ. 2. Based on the calculated hydrogen concentration $\delta$, the hydrogen concentration inside the reaction chamber 1a is maintained at a concentration necessary to carry out the hydrogen treatment of the optical fiber 2 inside the reaction chamber 1a sufficiently. Specifically, in the case in which the hydrogen concentration inside the reaction chamber 1a does not reach the concentration required for the hydrogen treatment, the gas inlet opening and closing valve 1c is opened and the hydrogen containing gas is supplied into the reaction chamber 1a. In contrast, in the case in which the hydrogen concentration inside the reaction chamber 1a exceeds the concentration required for the hydrogen treatment, the gas inlet opening and closing valve 1c is closed and the supply of the hydrogen containing gas into the reaction chamber 1a is stopped.

$$\delta = \alpha \times (1 - \gamma/\beta) \qquad \text{EQ. 2}$$

where $\delta$ indicates a hydrogen concentration inside the treatment chamber during the hydrogen treatment, $\alpha$ indicates an initial value of the hydrogen concentration in the hydrogen containing gas inside the treatment chamber, $\beta$ indicates concentration of oxygen in the ambient atmosphere (air) of the treatment chamber, and $\gamma$ indicates concentration of oxygen in the hydrogen containing gas inside the treatment chamber.

An oxygen densitometer (not shown) was used to measure the concentration $\beta$ of the oxygen in the ambient atmosphere (air) of the reaction chamber 1a and the concentration $\gamma$ of the oxygen in the hydrogen containing gas in the reaction chamber 1a. Examples of oxygen densitometers that can be used are Toray's LC-750 and Yokogawa's oxygen densitometer OX61.

In this manner, the amount of air mixed into the atmosphere of the reaction chamber 1a is calculated by measuring the concentration β of the oxygen in the ambient atmosphere (air) of the reaction chamber 1a and the concentration γ of the oxygen in the hydrogen containing gas inside the reaction chamber 1a, and it is possible to calculate the present hydrogen concentration inside the reaction chamber 1a from these calculated values. Because there are dangers such as explosions and the like when the gas used in the treatment of the optical fiber is an inflammable gas (hydrogen) as in the hydrogen treatment, in terms of control, measurement of the hydrogen concentration using a conventional combustion densitometer or an optical densitometer is not preferable. Thus, in the case in which hydrogen containing gas is used as the gas that serves as the base, the present hydrogen concentration inside the reaction chamber 1a is calculated by measuring the concentration of the air, and in particular, the oxygen, mixed in the hydrogen containing gas inside the reaction chamber 1a. The reason for this is that a cause of the hydrogen concentration becoming low is the air mixed into the hydrogen containing gas inside the reaction chamber 1a during the hydrogen treatment. Therefore, it is possible to determine the amount (concentration) of air (oxygen) that has mixed into the hydrogen containing gas inside the reaction chamber 1a, and thereby it is possible to determine the present hydrogen concentration inside the reaction chamber 1a.

Thereby, according to the treatment method for an optical fiber in this embodiment, there are no dangers such as explosions, and thereby it is possible to control the hydrogen concentration correctly even when the composition ratios of the gas serving as the base (the hydrogen containing gas) inside the reaction chamber 1a fluctuate.

In addition, in the treatment method for an optical fiber in this embodiment, preferably the reaction chamber 1a is a sealed container. If the reaction chamber 1a is a sealed container, before carrying out the hydrogen treatment of the optical fiber 2 inside the reaction chamber 1a, a reduced pressure atmosphere can be created inside the reaction chamber 1a.

Furthermore, in the treatment method for an optical fiber in this embodiment, preferably the hydrogen treatment of the optical fiber 2 is carried out after a reduced pressure atmosphere has been created inside the reaction chamber 1a.

In this embodiment, a method will be explained in which the hydrogen treatment of the optical fiber 2 is carried out after a reduced pressure atmosphere has been created inside the reaction chamber 1a.

After placing the optical fiber 2 inside the reaction chamber 1a of the treatment apparatus 1 and activating the discharge pump 1g, which is a vacuum pump, the discharge opening and closing valve 1f is opened, and a reduced pressure atmosphere is created inside of the reaction chamber 1a, that is, inside the space accommodating the optical fiber 2, by discharging the air inside the reaction chamber 1a, and the optical fiber 2 is exposed in the reduced pressure atmosphere.

Next, after providing a state of constant temperature within a range of 5° C. to 40° C. by adjusting the temperature inside the reaction chamber 1a, the gas inlet opening and closing valve 1c is opened and the hydrogen containing gas is supplied into the reduced pressure atmosphere inside the reaction chamber 1a. Subsequently, the hydrogen containing gas is supplied until the inside of the reaction chamber 1a reaches a predetermined pressure and the atmosphere in the space inside the reaction chamber 1a that accommodates the optical fiber 2 is replaced by the hydrogen containing gas. Then the inside of the reaction chamber 1a is sealed by closing the gas inlet opening and closing valve 1c, and in this reaction chamber 1a, the optical fiber 2 is exposed to the hydrogen containing gas atmosphere.

In this manner, it is possible to make the dispersion rate of the hydrogen containing gas inside the reaction chamber 1a high by creating a reduced pressure atmosphere inside the reaction chamber 1a that accommodates the optical fiber 2 and supplying the hydrogen containing gas into the reaction chamber 1a in this reduced pressure state. Thereby, even when the optical fiber 2 has been wound around the bobbin 3, the hydrogen containing gas passes through minute gaps between the wound optical fiber 2 and spreads quickly into proximity to the coil core of the bobbin 3. Therefore, the probability of contact between the optical fiber 2 in proximity to the coil core of the bobbin 3 and the hydrogen containing gas can be made high. Thus, it is possible to apply the hydrogen treatment sufficiently (evenly) throughout the entire length of the optical fiber 2.

Below, the invention will be explained in greater detail by using an experimental example. However, the invention is not limited by the following experimental example.

Experimental Example

An apparatus identical to the optical fiber optical fiber treatment apparatus shown in FIG. 1 was used to apply the deuterium treatment to an optical fiber.

The deuterium treatment for an optical fiber was repeated; the deuterium concentration in the reaction chamber was measured each time by an optical densitometer (Riken Measuring Instruments, FI-21); the oxygen concentration in the reaction chamber was measured by using an oxygen densitometer (Toray, LC-750H); and gas chromatography of the deuterium inside the reaction chamber was carried out.

The deuterium gas used a nitrogen gas as the base.

Figure 5:
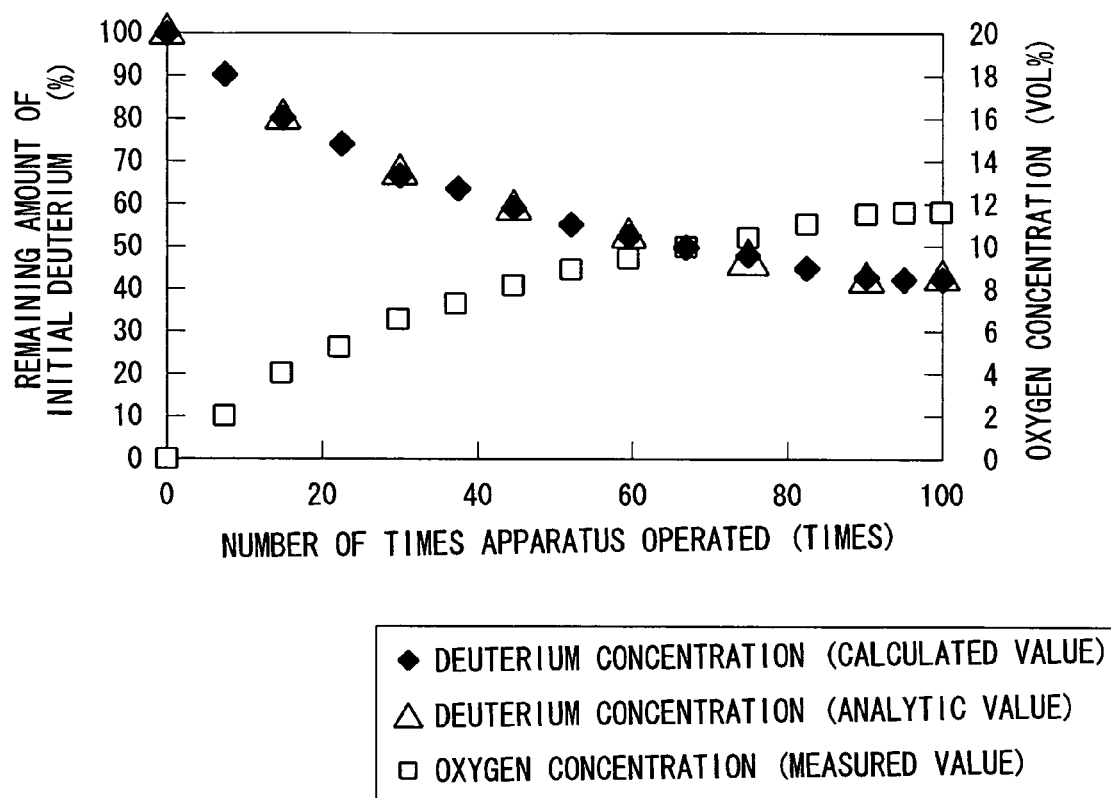
FIG. 5 is a graph showing the results of the measurement of the deuterium concentration in the test samples of the invention.

The results of the measurements are shown in FIG. 5.

In FIG. 5, the deuterium concentration (calculated value, indicated by the rhombic symbols) denotes the value calculated from the oxygen concentration inside the reaction chamber measured in this experimental example and EQ. 1 described above. In addition, the deuterium concentration (analytic value, indicated by the triangular symbols) denotes the value obtained from the gas chromatography analysis in the present experimental example. Furthermore, the oxygen concentration (measured value, indicated by the square symbols) denotes the value of the oxygen concentration inside the reaction chamber measured in the present experimental example.

From the results shown in FIG. 5, it has been confirmed that, like the case in which the deuterium inside the reaction chamber is analyzed by gas chromatography, the deuterium concentration can be measured easily by finding the deuterium concentration in the reaction chamber from the values of the oxygen concentration in the reaction chamber measured by the oxygen densitometer using EQ. 1 described above.

The treatment method for an optical fiber of the invention can be applied when using treatment gases other then deuterium or hydrogen.

It is contemplated that numerous modifications may be made to the exemplary embodiments of the invention without departing from the spirit and scope of the embodiments of the present invention as defined in the following claims.

What is claimed is:

1. A treatment method for an optical fiber, comprising:
   accommodating an optical fiber inside a treatment chamber;
   introducing a deuterium containing gas into the treatment chamber; and
   in a deuterium treatment step, exposing the optical fiber to atmosphere of the deuterium containing gas, wherein, in the deuterium treatment step, a deuterium concentration D in the treatment chamber during the deuterium treatment is calculated from an initial value A of a deuterium concentration in the deuterium containing gas inside the treatment chamber, a concentration B of oxygen in an ambient atmosphere of the treatment chamber, and a concentration C of oxygen in the deuterium containing gas inside the treatment chamber, and the deuterium concentration in the treatment chamber is controlled based on the deuterium concentration D calculated.

2. A treatment method for an optical fiber according to claim 1, wherein the deuterium concentration D in the treatment chamber during the deuterium treatment step is calculated using EQ. 1 below:

$$D = A \times (1 - C/B) \qquad \text{EQ. 1}$$

where A indicates the initial value of the deuterium concentration in the deuterium containing gas inside the treatment chamber, B indicates the concentration of oxygen in the ambient atmosphere (air) of the treatment chamber, and C indicates the concentration of oxygen in the deuterium containing gas inside the treatment chamber.

3. A treatment method for an optical fiber according to claim 1, wherein the treatment chamber is a sealed chamber.

4. A treatment method for an optical fiber according to claim 1, wherein a reduced pressure state is created inside the treatment chamber before the deuterium containing gas is introduced.

5. A treatment method for an optical fiber according to claim 4, wherein pressure in the treatment chamber during the reduced pressure state is set within a range of equal to or greater than 0.01 kPa to equal to or less than 75 kPa.

6. A treatment method for an optical fiber according to claim 1, wherein partial pressure of deuterium during the deuterium treatment step is set within a range of equal to or greater than 0.1 kPa to equal to or less than 5 kPa.

7. A treatment method for an optical fiber according to claim 1, wherein pressure in the treatment chamber during the deuterium treatment step is set within a range of equal to or greater than 10.1 kPa to equal to or less than 203 kPa.

8. A treatment method for an optical fiber according to claim 1, wherein a temperature inside the treatment chamber is maintained at a constant temperature within a range of equal to or greater than 5° C. to equal to or less than 40° C. during the deuterium treatment step.

9. A treatment method for an optical fiber, comprising:
accommodating an optical fiber inside a treatment chamber;
introducing a hydrogen containing gas into the treatment chamber; and
in a hydrogen treatment step, exposing the optical fiber to atmosphere of the hydrogen containing gas, wherein,
in the hydrogen treatment step, a hydrogen concentration $\delta$ in the treatment chamber during the hydrogen treatment is calculated from an initial value $\alpha$ of a hydrogen concentration in the hydrogen containing gas inside the treatment chamber, a concentration $\beta$ of oxygen in an ambient atmosphere of the treatment chamber, and a concentration $\gamma$ of oxygen in the hydrogen containing gas inside the treatment chamber, and the hydrogen concentration in the treatment chamber is controlled based on the hydrogen concentration $\delta$ calculated.

10. A treatment method for an optical fiber according to claim 9, wherein the hydrogen concentration $\delta$ in the treatment chamber during the hydrogen treatment step is calculated using EQ. 2 below:

$$\delta = \alpha \times (1 - \gamma/\beta) \qquad \text{EQ. 2}$$

where $\alpha$ indicates the initial value of the hydrogen concentration in the hydrogen containing gas inside the treatment chamber, $\beta$ indicates the concentration of oxygen in the ambient atmosphere (air) of the treatment chamber, and $\gamma$ indicates the concentration of oxygen in the hydrogen containing gas inside the treatment chamber.

11. A treatment method for an optical fiber according to claim 9, wherein the treatment chamber is a sealed chamber.

12. A treatment method for an optical fiber according to claim 9, wherein a reduced pressure state is created inside the treatment chamber before the hydrogen containing gas is introduced.

13. A treatment method for an optical fiber according to claim 12, wherein pressure in the treatment chamber during the reduced pressure state is set within a range of equal to or greater than 0.01 kPa to equal to or less than 75 kPa.

14. A treatment method for an optical fiber according to claim 9, wherein partial pressure of hydrogen during the hydrogen treatment step is set within a range of equal to or greater than 0.1 kPa to equal to or less than 4 kPa.

15. A treatment method for an optical fiber according to claim 9, wherein pressure in the treatment chamber during the hydrogen treatment step is set within a range of equal to or greater than 10.1 kPa to equal to or less than 203 kPa.

16. A treatment method for an optical fiber according to claim 9, wherein a temperature inside the treatment chamber is maintained at a constant temperature within a range of equal to or greater than 5° C. to equal to or less than 40° C. during the hydrogen treatment step.

17. A treatment method for an optical fiber according to claim 1, wherein non-bridging oxygen hole centers or NBO-HCs which are generated in the optical fiber react with the deuterium or are annihilated at the same reaction rate in both the optical fiber positioned in an innermost layer and the optical fiber positioned in an outermost layer, so that there is no annihilation delay time.

18. A treatment method for an optical fiber according to claim 1, wherein the absorption wavelength region of the optical fiber is shifted from the 1.38 μm band, which is the absorption wavelength region of the hydroxyl group, to the 1.87 μm band, which is the absorption wavelength region of the deuterated hydroxyl group.

19. A treatment method for an optical fiber according to claim 1, wherein absorption loss caused by the hydroxyl groups in the silica glass of the optical fiber inhibits degradation of the transmission characteristics of the optical fiber.

20. A treatment method for an optical fiber according to claim 1, wherein a dispersion rate of the deuterium containing gas in the reaction chamber is increased.

21. A treatment method for an optical fiber according to claim 1, wherein an optical fiber treatment apparatus comprises a reaction chamber, a deuterium storage tank and piping by which the reaction chamber communicates with the deuterium storage tank.

22. A treatment method for an optical fiber according to claim 21, wherein the deuterium containing gas stored in the deuterium storage tank is used in the deuterium treatment of at least one other optical fiber.

23. A treatment method for an optical fiber according to claim 1, wherein the deuterium gas used a nitrogen gas as a base.

24. A treatment method for an optical fiber, comprising:
accommodating an optical fiber inside a treatment chamber;

introducing a treatment gas into the treatment chamber; and in a treatment step, exposing the optical fiber to atmosphere of the treatment gas, wherein, in the treatment step, a treatment gas concentration D in the treatment chamber during the treatment is calculated from an initial value A of a treatment gas concentration in the treatment gas inside the treatment chamber, a concentration B of a base gas in an ambient atmosphere of the treatment chamber, and a concentration C of the base gas in the treatment gas inside the treatment chamber, and the treatment gas concentration in the treatment chamber is controlled based on the treatment gas concentration D calculated.

* * * * *